(12) United States Patent
De Mareschal et al.

(10) Patent No.: US 8,316,290 B2
(45) Date of Patent: Nov. 20, 2012

(54) SAFE THRESHOLD-DETECTION DEVICE FOR A RAILWAY SYSTEM

(75) Inventors: Odon De Mareschal, Villepreux (FR); Jacques Thanh Tung, Ormoy (FR); Pascal Plantard, Basse Goulaine (FR)

(73) Assignee: Alstom Transport SA, Levallois-Perret (FR)

( * ) Notice: Subject to any disclaimer, the term of this patent is extended or adjusted under 35 U.S.C. 154(b) by 840 days.

(21) Appl. No.: 12/381,980

(22) Filed: Mar. 18, 2009

(65) Prior Publication Data

US 2009/0241014 A1    Sep. 24, 2009

(30) Foreign Application Priority Data

Mar. 19, 2008   (FR) ..................... 08 51762

(51) Int. Cl.
*H03M 13/00*      (2006.01)
(52) U.S. Cl. ...................................... 714/824
(58) Field of Classification Search ............. 714/20, 714/21, 25, 27, 37, 39, 47.2, 721, 745, 750, 714/819, 820, 824
See application file for complete search history.

(56) References Cited

U.S. PATENT DOCUMENTS

| 4,005,601 | A | * | 2/1977 | Botello ............................ 73/146 |
| 4,583,176 | A | * | 4/1986 | Yamato et al. ................. 701/114 |
| 5,229,875 | A | * | 7/1993 | Glista ............................... 398/4 |
| 5,794,167 | A | * | 8/1998 | Gruere et al. ................ 701/29.2 |
| 2004/0078101 | A1 | * | 4/2004 | Kondoh et al. ................. 700/79 |

FOREIGN PATENT DOCUMENTS

EP   0 621 521   10/1994

* cited by examiner

*Primary Examiner* — Nadeem Iqbal
(74) *Attorney, Agent, or Firm* — Davidson, Davidson & Kappel, LLC

(57) ABSTRACT

A device for the safe threshold-detection of state information from an analog signal including a decision component and at least two acquisition diversity channels including in series a safe adaptation circuit, an electronic analog-to-digital conversion circuit, and a unit for comparing the digital output signal of the analog-to-digital conversion circuit with a reference signal is provided.

The device comprises a fault detection circuit for the mutual comparison of digital output signals from the conversion circuits and supplies a consistency result.

The output of the decision component is a function of the consistency result supplied by the fault detection unit and of the comparison results from the comparison units associated with the respective acquisition channels.

17 Claims, 4 Drawing Sheets

SAFE THRESHOLD-DETECTION DEVICE FOR A RAILWAY SYSTEM

This claims priority to French Patent Application FR 08 51762, filed Mar. 19, 2008, the entire disclosure of which is hereby incorporated by reference herein.

BACKGROUND OF THE INVENTION

The invention relates to a device and a method for the safe threshold-detection of state information from an analog signal, intended in particular for a railway type application.

Such a device is used for the acquisition of reliable information on the states of a track circuit, for example of a light or a shunt position, by a safety computer which then executes processes associated with the change of state of the information and then sends commands to signaling equipment.

A state of a command or signaling variable is known to be referred to as a "restrictive state", which state, when it is detected and when it is incorrect, leads to serious danger of an accident.

A state of a command or signaling variable is known to be referred to as a "permissive state", which state, when it is detected and when it is incorrect, does not lead to a loss of safety.

The term "safe detection" defines the design of a device or a method which ensures that it is impossible to detect a permissive state on a signal representing a restrictive state. Conversely, in such a design, the detection of a permissive or restrictive state on a signal representing a permissive state is allowed.

Conventionally, a safe detection circuit comprises a safe threshold circuit implemented in the form of a diode or a transistor, and which uses in a safe manner the non-linear variation in impedance of the semiconductor junction present in these components.

The design and safety validation of such a detection circuit is extremely complex and costly due in particular to an ill-defined switchover limit in the linear zone.

SUMMARY OF THE INVENTION

An objective of the invention is to replace a conventional safe threshold circuit of the semiconductor junction type with a safe threshold circuit that is less complex to develop and to validate in terms of safety design.

The present invention provides a device for the safe threshold-detection of state information from an analog signal, intended in particular for a railway type application, said device comprising:
  a decision component able to determine safe detected state information from the device at an output and at least two acquisition diversity channels, each acquisition channel including in series:
  a circuit for adapting the analog signal into a safe adapted continuous analog signal;
  an unsafe channel threshold circuit able to supply channel state information, comprising a voltage source which is temperature-stabilized over a predetermined temperature range and used as voltage reference;
characterized in that
  the threshold circuit of each channel comprises:
  an electronic analog-to-digital conversion circuit able to receive the safe adapted continuous analog signal, input signal of the converter, and deliver a digital output signal sampling the input signal of the converter at a predetermined sampling frequency,
  a unit for comparing the digital output signal with a digital reference signal able to supply channel output state information as the result of the comparison;
in that the device comprises
  a circuit for detecting a fault on the device able to mutually compare the digital output signals supplied as inputs and outputted respectively by the analog-to-digital conversion circuits, and able to supply as an output a consistency result which is a function of the mutual comparison of the digital output signals;
  and in that the output of the decision component is a function of the consistency result supplied by the fault detection unit and of the comparison results from the comparison units associated with the respective acquisition channels.

According to particular embodiments, the safe threshold-detection device can include one or more of the following features:
  the input signal of each analog-to-digital conversion circuit is suitable for being sampled at a sufficient rate greater than twice the inverse of the duration of the transient corresponding to the change of state of the input signal;
  the fault detection circuit comprises only one comparator able to mutually compare the digital output signals issued from each analog-to-digital conversion circuit sample by sample and able to declare a mutual consistency when the difference between two samples is within a predetermined width interval;
  the fault detection circuit comprises at least two vector comparators able to mutually compare the digital output signals issued from each analog-to-digital conversion circuit based on a set of samples and able to declare a mutual consistency between two digital signals when a distance between two sets of samples is less than a predetermined value;
  the temperature stability of the voltage source is adjusted so that the temperature sensitivity of each analog-to-digital conversion circuit is at least less than the temperature sensitivity of the detection threshold of a safe temperature-compensated semiconductor junction circuit, the temperature sensitivity being defined as a variation in voltage or reference voltage, respectively, for the analog-to-digital conversion circuit and threshold voltage for the junction circuit, observed over the same predetermined temperature range;
  the analog-to-digital converters are from different technological processes;
  each comparison unit of an acquisition channel comprises an input for receiving a digital reference signal and a means for adjusting the value of the digital reference signal;
  the adaptation circuit of a channel comprises a galvanic isolation transformer;
  the adaptation circuit of a channel comprises a current rectifier circuit connected to the secondary of the transformer;
  the adaptation circuit of a channel comprises an optocoupler;
  the device comprises only two acquisition channels, and when the mutual consistency result is negative, the fault detection circuit is able to deliver to the decision component an output signal at the restrictive state, and able to additionally transmit a diagnostic signal regarding a failure of the device;
  the device comprises at least three channels and when there is a majority of digital output signals that are substantially identical and the channel states are identical, the decision component is able to deliver the state information of channels that are mostly identical as a safe output state of the device;

the fault detection circuit is able to transmit a diagnostic signal regarding the failure of the detection device when there are at least two distinctly different digital output signals;

the fault detection circuit is able to transmit a signal identifying the failing acquisition channel when two digital output signals are substantially identical and distinctly different from the remaining third, the acquisition channel identified as failing being said third channel; and each acquisition channel comprises a switching circuit with at least one input of a first type able to receive an adapted continuous signal, a second input of a second type able to receive a test signal and an output connected to the associated analog-to-digital conversion circuit of the channel able to deliver an output signal forming a time multiplex of signals received at the inputs of the first and second types.

The invention also relates to a method for the safe threshold-detection of state information from safe analog signals, intended in particular for a railway type application; it comprises the steps of:

sampling on at least two acquisition diversity channels adapted and isolated safe analog input signals, from the same analog input signal, to form digital output signals, determining the mutual consistency of the digital output signals by comparison, and supplying a consistency result, on each digital output signal, making a comparison with a predetermined associated threshold and detecting a channel output state, and determining the safe detection output state information as a function of the consistency result and of the information of the output states of the diversity channels.

According to particular embodiments, the safe threshold-detection method includes one or more of the following features:

it comprises the step of performing a channel operating state test using a calibrated test signal injected at the input of each channel.

BRIEF DESCRIPTION OF THE DRAWINGS

The invention will be better understood on reading the following description given purely by way of example and with reference to the drawings in which.

DETAILED DESCRIPTION OF THE PREFERRED EMBODIMENTS

Figure 1:
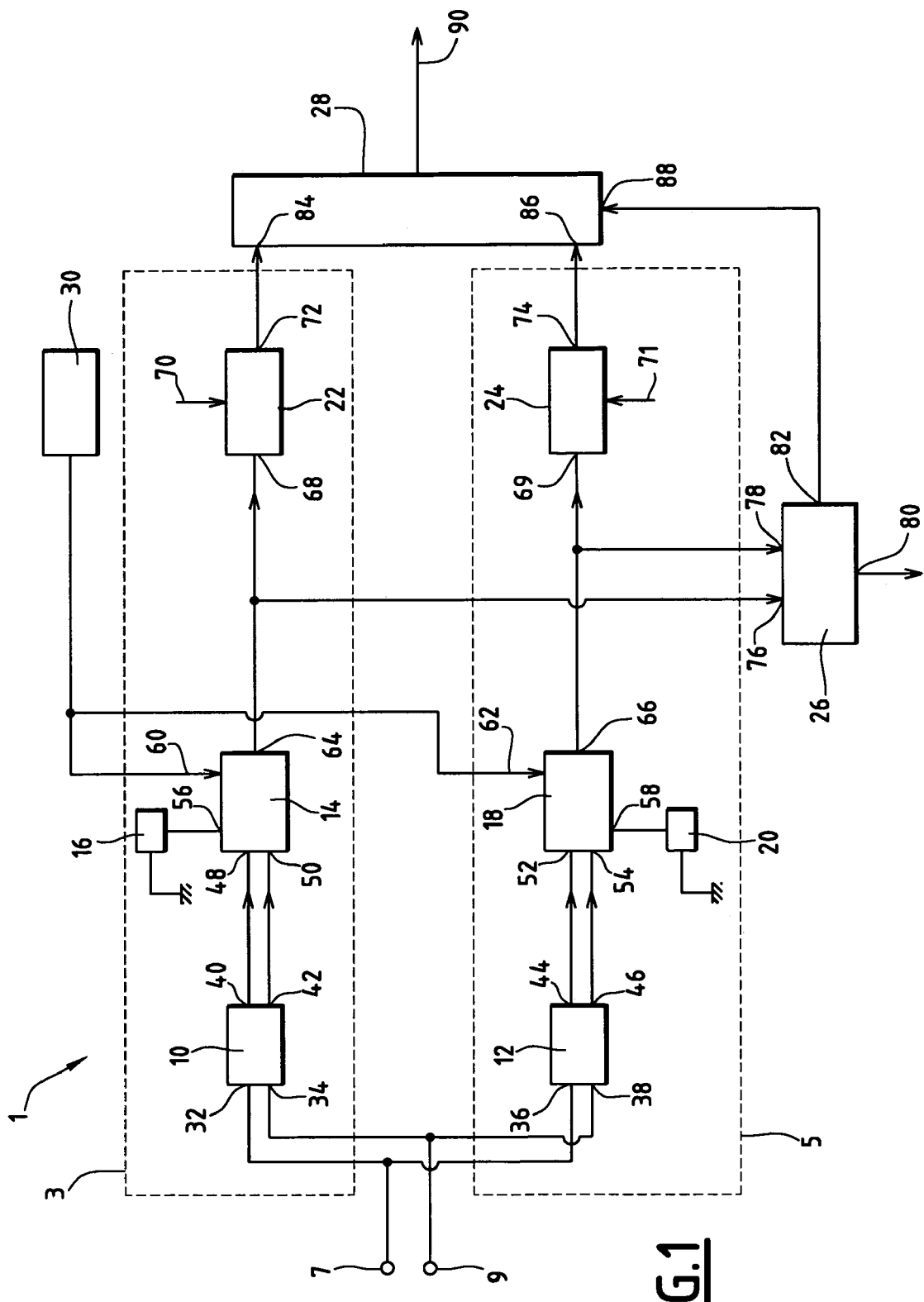
FIG. 1 is a schematic view of a first embodiment of a safe threshold-detection device according to the invention.

The safe threshold-detection device 1 of FIG. 1 is formed by two acquisition diversity channels 3 and 5, each acquisition channel being able to receive the same analog signal, in this case of the on-off type, from a double differential input formed by terminals 7 and 9.

Each acquisition channel 3 and 5 comprises in series an adaptation circuit 10 and 12 with galvanic isolation, an analog-to-digital conversion circuit 14 and 18 associated, respectively, with a temperature-stabilized voltage source 16 and 20 and a comparison unit 22 and 24.

The safe threshold-detection device 1 also comprises a fault detection circuit 26, a decision component 28 able to determine safe state information outputted by the device and a sampling clock 30.

The adaptation circuits 10 and 12, with galvanic isolation, are also provided with, respectively, input terminals 32, 34 and 36, 38 connected to the input terminals 7 and 9 for receiving the analog input signal.

The galvanic isolation adaptation circuits 10 and 12 are also provided with, respectively, output terminals 40, 42 and 44, 46 able to deliver a safe adapted continuous analog signal of the on-off type, obtained from an analog signal of the on-off type supplied at the inputs 32, 34 and 36, 38.

A safe adapted signal means that it is impossible to transform through the adaptation an actually restrictive state into a permissive state, the converse being of little importance.

In this case, it is assumed that the analog input signal is of the DC type. The galvanic isolation adaptation circuit comprises an LC type oscillator (Colpitts type circuit for example with an inductor L and a capacitor C) able to supply a voltage proportional to the input voltage and a signal of relatively high frequency (50 to 100 kHz), and a transformer, the primary circuit of which is at least a part of the inductor of the oscillator. The input of the transformer can thus be isolated from circuits connected to the secondary circuit of the transformer. At the secondary of the transformer, two full-wave rectifiers are connected so as to be able to supply a positive voltage and a negative voltage for diversity.

The safety-related design of this circuit, referred to as being fail-safe, ensures that the rectified voltage cannot increase in an untimely way.

As a variant, when the input signal is presented in the form of an alternating voltage, the galvanic isolation adaptation circuit 10, 12 comprises a current transformer. A resistor in series with the primary of the transformer determines the consumption of the circuit. The secondary is loaded by a rectifier followed by two resistors of different technologies in series, the common point being connected to the point at zero volts on the transformer. The galvanic isolation circuit is thus able to supply a positive voltage and a negative voltage for diversity.

As a variant, each galvanic isolation circuit comprises an optocoupler.

The electronic analog-to-digital conversion circuits 14 and 18 are electronic integrated circuits of the VLSI type, for example called ADCs, produced commercially on a large scale and which come from two different manufacturers using different fabrication methods, the methods being also referred to as technological processes.

The electronic analog-to-digital conversion circuits 14 and 18 are associated with the temperature-stabilized voltage sources 16 and 20 respectively.

The electronic analog-to-digital conversion circuits 14 and 18 are connected, respectively, via their input terminals 48, 50 and 52, 54 to the output terminals 40, 42 and 44, 46 of the galvanic isolation adaptation circuits 10 and 12.

The electronic analog-to-digital conversion circuits 14 and 18 comprise, respectively, reference voltage input terminals 56 and 58 connected to the temperature-stabilized voltage sources 16 and 20. They additionally comprise, respectively, input terminals 60 and 62 for controlling a sampling instant, connected to the sampling clock 30 and, respectively, output terminals 64 and 66 able to deliver digital sampling output signals in the form of vectors with binary values corresponding to the differential input analog signals supplied at 48, 50 and 52, 54 which are sampled.

The sampling frequency of each analog-to-digital conversion circuit 14 and 18 is chosen so as to be sufficient for supplying to the output terminals 64 and 66 in a synchronous or quasi-synchronous manner at least two sample values of input signals taken in the time interval defined by the transient corresponding to the change of state of the input signals supplied, respectively, to the input terminals 48, 50 and 52 and 54, thus observing the conventional "Shannon" condition which requires a sampling frequency equal to twice the bandwidth of the spectrum representing the signal to be sampled in order to be able to reproduce it faithfully.

In this case, the same clock 30 is connected to two analog-to-digital conversion circuits 14, 18, thus ensuring that the sampling operations of the two electronic analog-to-digital conversion circuits are synchronized.

As a variant, several synchronous or quasi-synchronous clocks between them drive the analog-to-digital conversion circuits 14 and 18.

The voltage sources 16, 20 are low current temperature-regulated electronic voltage sources of a type that is well known in analog electronics under the term "voltage regulator", and each exhibits the characteristic of an output voltage that is in temperature-stable.

The comparison units 22 and 24 comprise input terminals 68, 69 respectively, connected to the output terminals 64, 66 respectively of the electronic analog-to-digital conversion circuits 14, 18 and input terminals 70 and 71 intended to receive reference signals with a view to performing a comparison between the digital output signals from the analog-to-digital conversion circuits and the reference signals.

The comparison units 22 and 24 also comprise output terminals 72 and 74 respectively, intended to deliver the results of the comparisons, each comparison result being an item of state information outputted by the acquisition channels 3, 5.

The reference signals of the comparison units 22, 24 are fixed value signals which can be adjusted by adjustment means not represented in FIG. 1.

The comparison units 22, 24 are for example CMOS technology digital electronic circuits, conventionally called digital comparators. In this case, the input terminals 68, 69, 70, 71 are multiple input terminals due to the fact that each terminal receives a vector of bits in the form of parallel inputs whereas the other terminals are single terminals for supplying one comparison result bit.

As a variant, the reference signals are more complex signals formed by several binary vectors with a view to performing a comparison of a functional type on a time series of sample vectors. In this case, the comparison units 22, 24 are more complex CMOS technology digital electronic circuits formed by a set of digital vector comparators in the case of parallel processing or by a single digital vector comparator in the case of serial processing, and a distance computing unit.

The fault detection circuit 26 of the device comprises two input terminals 76 and 78 connected to the output terminals 64 and 66 respectively of the analog-to-digital conversion circuits 14, 18.

The fault detection circuit 26 also comprises two output terminals 80 and 82.

The first output terminal 80 is able to transmit a fault diagnostic signal for the device 1, a failure being able to arise on one or two acquisition channels.

The output terminal 82 is able to supply a consistency result from the mutual comparison and from the remote computation of the digital output signals from the analog-to-digital conversion circuits 14, 18.

Here, two digital output signals are consistent with each other when their mutual distance is less than a predetermined value.

Here, the distance between two signals is equal to the difference between only two samples supplied at the inputs 76, 78 associated with the analog-to-digital conversion circuits 14, 18 respectively taken at the same sampling instant.

The fault detection circuit 26 is implemented in the form of a digital subtractor followed by a digital comparator with two vector inputs and a one-bit CMOS technology output.

As a variant, the distance is a functional distance formed from the differences of each sample of the same rank of two time series of samples associated with the inputs 76 and 78 respectively. In this case, the fault detection circuit 26 is implemented in the form of a more complex CMOS technology digital electronic circuit formed by a set of digital vector comparators in the case of parallel processing or a single digital vector comparator in the case of serial processing and a computing unit, and a distance computing unit.

As a variant, two digital output signals are consistent with each other when the result of the correlation function operating on the two signals is greater than a predetermined threshold value. In this case, the fault detection circuit is implemented in the form of an electronic correlator followed by an electronic comparator.

The decision component 28 able to determine the safe state information outputted by the safe threshold-detection device comprises three inputs 84, 86 and 88. The inputs 84 and 86 are connected to the outputs 72 and 74 respectively of the digital comparison units 22 and 24 while the input 88 is connected to the output 82 of the fault detection circuit 26.

The decision component 28 comprises an output 90 to which the safe state information outputted by the device 1 is delivered, which is a function of the consistency result supplied by the fault detection circuit 26 at 88 and of the comparison results or channel state information from the comparison units 22 and 24 supplied at the input terminals 84 and 86.

In order to ensure the safe design of the device, the decision component 28 is able to force the output state to a restrictive state when the consistency result is negative, i.e. when there is a lack of consistency or when the results of the comparisons from the comparison units 22, 24 are different.

The decision component 28 is implemented in the form of either a discrete set of hard-wired logic circuits, or an FPGA or a programmed microprocessor.

As a variant, the decision component 28 and the fault detection circuit 26 are implemented in the form of one and the same programmed microprocessor.

When operating, an on-off analog input signal is supplied to the differential input terminals 7 and 9. The same analog input signal is supplied to the inputs 32, 34 and 36, 38 of the galvanic isolation adaptation circuits 10 and 12 associated with the acquisition channels 3 and 5 respectively.

The input signals are adapted by the galvanic isolation adaptation circuits 10 and 12 into safe adapted analog signals.

The signals thus entering the analog-to-digital conversion circuits 14 and 18 are sampled at the clock frequency supplied by the clock 30 in relation to the temperature-stabilized voltage source, 16 and 20 respectively, in order to deliver sampled digital output signals to the outputs 64 and 66.

The digital output signals supplied to the inputs 76 and 78 are mutually compared by the fault detection circuit 26 and the consistency result is presented in the form of a binary signal as already described above.

The consistency result indicates in a sharper and more precise manner the determination of whether at least one acquisition channel 3, 5, before the threshold comparison was carried out at each channel, is faulty for example due to a failing analog-to-digital conversion circuit in one of the two channels.

If such a fault exists, regardless of the comparison information items supplied by the comparison units 22 and 24, even if they are identical, the decision component 28 delivers a restrictive state information item at 90 in order to ensure the safety of the railway system.

Thus, the safety function of the conventional-design safe threshold circuit, which is expensive to develop, is implemented by a threshold circuit of a different design using electronic analog-to-digital converters that are widely available commercially and an associated digital processing unit that is not very complex nor expensive in terms of development and safety validation.

It is to be noted that a consistency test carried out from the comparison results of the comparison units only corresponds to a diversity strategy with majority voting which is already well known. Such a test would require a large number of diversity channels to render the detection of the state safe, due to the fact that the comparison units are unsafe threshold detectors Conversely, the mutual consistency test carried out before the channel comparison units according to the invention is safe due to the fact that the entire informational content of the output signals of the analog-to-digital conversion circuits and therefore their differences is analyzed.

Furthermore, such a device has the advantage of an improved control of the temperature operating threshold due to the fact that it is possible to provide a very precise temperature-stabilized voltage source, commonly called a voltage regulator. Temperature-stable voltage sources of the voltage regulator type ensure that the temperature sensitivity for each analog-to-digital conversion circuit 14 and 18 is at least less than the temperature sensitivity of the detection threshold of a conventional temperature-compensated semiconductor junction circuit of safe design. The temperature sensitivity is defined as a variation in voltage or reference voltage, respectively, for the analog-to-digital conversion circuit and threshold voltage for the junction circuit, observed over the same predetermined temperature range.

The device 1 also enables an improvement in the control of the switchover limit in the linear operating zone corresponding to the transient of a state change by having a sufficient number of samples during the switchover transient. Provision is thus made for carrying out an appropriate signal processing such as thermal noise filtering, distortion corrections and suppression of discrete interference. Thus it is possible to reduce the hysteresis amplitude of the triggering threshold of the detection device.

Advantageously, the detection device 1 provides for determining whether at least one channel is failing.

Figure 2:
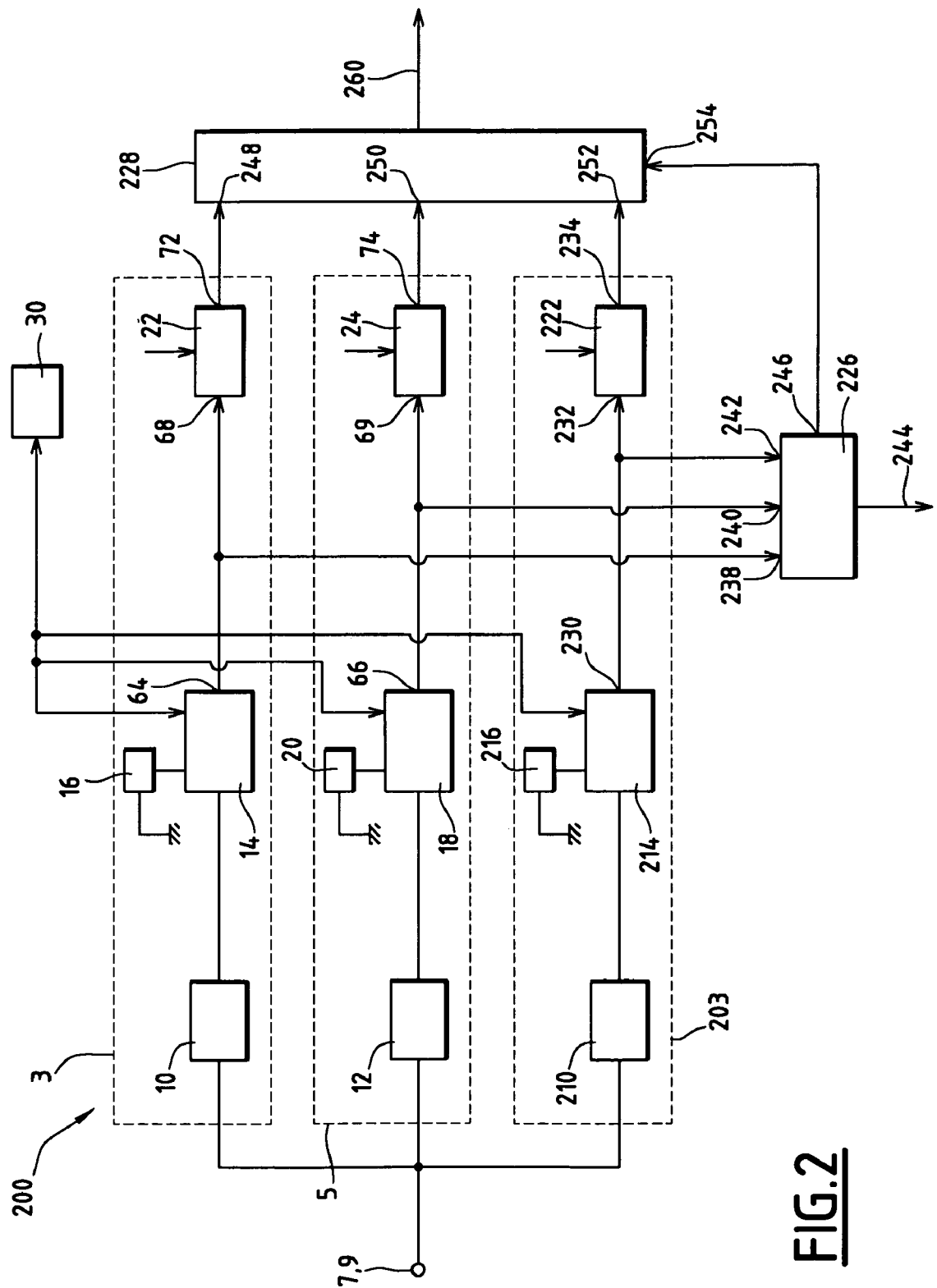
FIG. 2 is a schematic view of a second embodiment of a safe threshold-detection device according to the invention.

FIG. 2 represents a second embodiment of the safe threshold-detection device 200 with three acquisition diversity channels.

The set of three acquisition channels configured in parallel is formed by two acquisition channels 3 and 5, the description of which is identical to that of FIG. 1 and by an additional acquisition channel 203 also connected to the input terminals 7 and 9 and intended to receive the on-off type analog input signal.

Like the two acquisition channels 3 and 5, the additional acquisition channel 203 comprises in the same way to that described in FIG. 1, mounted in series, a galvanic isolation adaptation circuit 210, an analog-to-digital conversion circuit 214 associated with a voltage source 216 with an output terminal 230, and a comparison unit 222 with an input 232 connected to the output terminal 230.

The device 201 also comprises a fault detection circuit 226 with three inputs and two outputs and a decision component 228, able to determine safe state information outputted by the device, with four inputs and one output.

The three input terminals 238, 240 and 242 of the fault detection circuit 226 are connected to the output terminals 64, 66, 230 respectively of the analog-to-digital conversion circuits 14, 18, 214.

The fault detection circuit 226 also comprises an output terminal 244 intended to deliver a diagnostic signal indicating a failure of the device 201 with, if necessary, an identification of a faulty acquisition channel and an output terminal 246 intended to supply a consistency result signal in the form of a triplet of consistency values.

The consistency values are the results of mutual comparisons of digital output signals, taken in pairs from the analog-to-digital conversion circuits 14, 18, 214.

Thus, the first, second and third consistency values are the results of mutual comparison between the digital output signals from the output terminals 64 and 66, 66 and 230, 64 and 230 respectively.

The decision component 228 comprises three input terminals 248, 250 and 252 connected to the output terminals 72, 74 and 234 respectively of the comparison units and an input 254, for supplying the consistency result, connected to the output 246 of the fault detection circuit 226.

The decision component 228 is able to determine safe state information outputted by the device 201 as a function of the comparison results from the comparison units supplied to the input terminals 248, 250 and 252 and of the consistency result delivered to an input 254.

The decision component 228 comprises an output terminal 260 intended to deliver the safe state information outputted by the detection device 201.

When operating, each acquisition channel 3, 5 and 203 operates in the same way as that described for any one of the acquisition channels in FIG. 1.

The fault detection circuit 226 executes three mutual comparisons between the digital output signals from the output terminals 64, 66 and 230 of the analog-to-digital conversion units 14, 18 and 214 taken in pairs instead of only one comparison as in the first embodiment and delivers a consistency signal in the form of a triplet of consistency values, each consistency value being computed by a method similar to that described for FIG. 1.

When the consistency result indicates that the three digital output signals are identical, the fault detection circuit 226 transmits on the output terminal 244 a failure absence signal, whereas when there is at least one signal from the three that is substantially different from at least one of the other two, then the fault detection circuit 226 transmits a signal indicating the presence of a failure on at least one of the channels.

In the particular case where only two digital output signals among the three are substantially identical, then the acquisition channel corresponding to the output signal that is substantially different from the other two is identified as a faulty channel and a signal identifying the failing channel is transmitted on the output terminal 244.

When a failure is detected by the fault detection circuit 226 with only two substantially identical digital output signals and two identical results of the comparison of the associated channels, the decision component 228 transmits on output 260 a state information signal identical to the identical results of the comparison of the two channels.

In the other cases, the decision component 228 transmits on output 260 a restrictive state information signal.

Advantageously, the configuration of FIG. 2 provides for not only detecting a fault on one of the acquisition channels but also in certain cases locating the faulty channel.

As a variant, the safe threshold-detection device comprises more than three acquisition channels.

Figure 3:
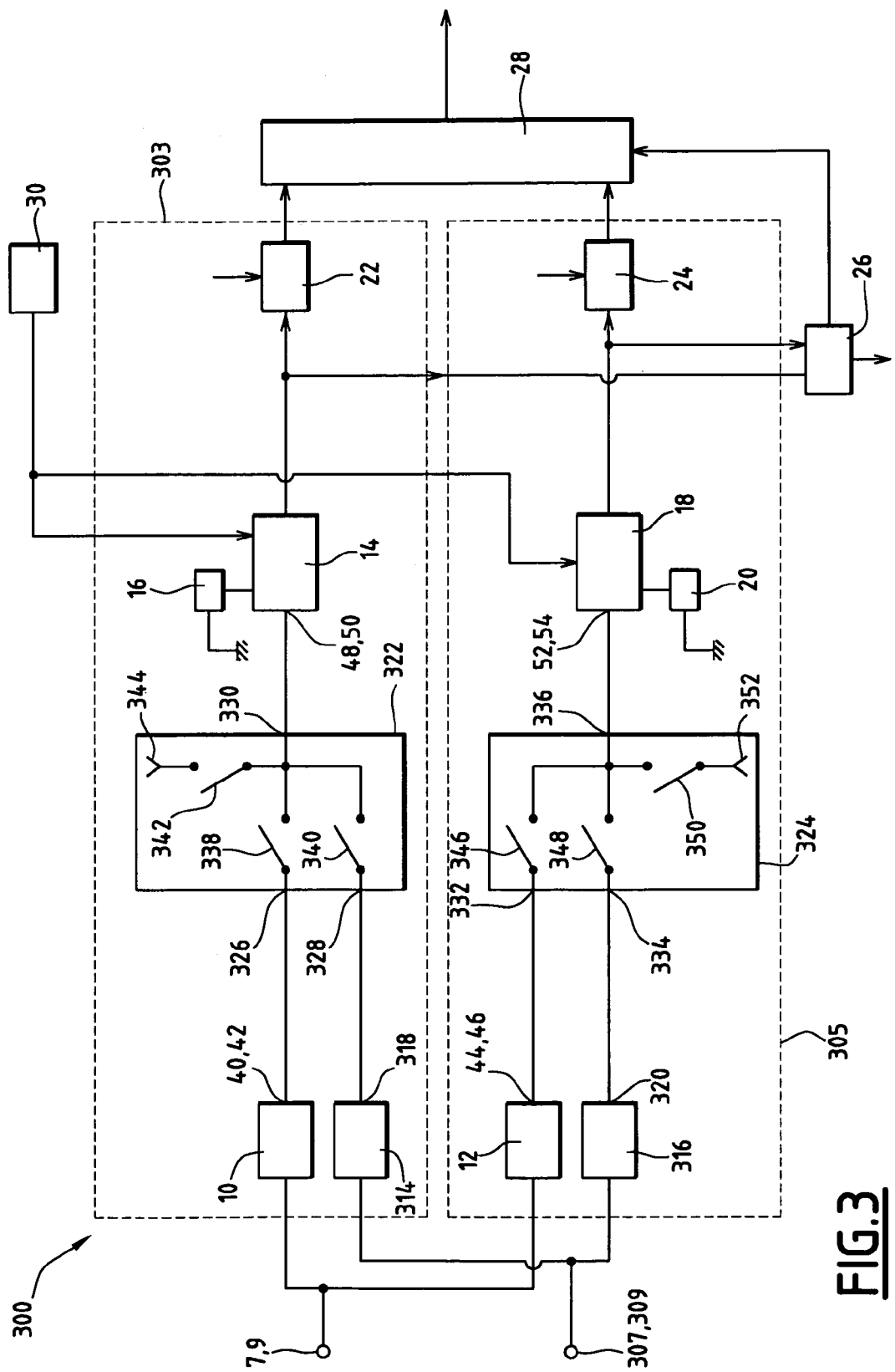
FIG. 3 is an improvement of the first embodiment described in FIG. 1 for providing a safe threshold-detection on at least two analog signal inputs.

FIG. 3 is a third embodiment in which the first embodiment described in FIG. 1 has been enhanced by switches in order to manage the input of several analog input signals.

In this third embodiment, the acquisition channel 3 described in FIG. 1 is replaced by an acquisition channel 303 in which a galvanic isolation circuit 314 has been added and connected to a second analog signal input 307, 309 and an output 318 of which is connected to the input of a switch 322.

In this third embodiment, the acquisition channel 5 described in FIG. 1 is replaced by an acquisition channel 305, in which a galvanic isolation circuit 316 has been added, connected to a second analog signal input 307, 309 and an output 320 of which is connected to the input of a switch 324.

The switch 322 of the channel 303 comprises two double input terminals 326, 328 connected to the output terminals 40, 42 and 318 respectively of the galvanic isolation adaptation circuits 10 and 314. The switch 322 also comprises a single terminal 330 able to deliver the selected signal during a switching action, and connected to the input of the analog-to-digital conversion circuit 14.

The switch 324 of the channel 305 comprises two double input terminals 332, 334 connected to the output terminals 44, 46 and 320 respectively of the galvanic isolation adaptation circuits 12 and 316.

The switch 324 also comprises a single terminal 336 able to deliver the selected signal during a switching action, and connected to the input of the analog-to-digital conversion circuit 18.

The switch 322 comprises three switches 338, 340 and 342.

The switches 338, 340 are connected between the terminals 326 and 330 and between the terminals 328 and 330 respectively, the switch 342 being connected between an input 344 able to receive a calibrated test signal and the output terminal 330.

The switch 324 comprises three switches 346, 348 and 350. The switches 346, 348 are connected between terminals 332 and 336 and terminals 334 and 336 respectively, the switch 350 being connected between an input 352 able to receive a calibrated test signal and the output terminal 336.

When operating, on the acquisition channel 303, the switch 322 switches onto the output 330, according to a time multiplex, two safe adapted analog continuous signals received at 326, 328 respectively and resulting from two analog input signals delivered at 7, 9 and 307, 309 respectively, and a test signal received on the input terminal 344.

In parallel, on the acquisition channel 305, the switch 324 switches onto the output 336, according to a time multiplex, two safe adapted analog continuous signals received at 332, 334 respectively and resulting from two same analog input signals delivered at 7, 9 and 307, 309 respectively as for the channel 303, and a test signal received on the input terminal 352.

The test signals supplied, respectively, to the inputs 344 and 352 enable a failure diagnostic to be carried out and the failure at an acquisition channel to be located, in particular at the analog-to-digital conversion circuit.

Advantageously, the embodiment of FIG. 3 provides for having a universal detection device capable of being adapted to, and interfacing with, a plurality of different analog signals of the on-off type.

It thus enables the design to be simplified and the cost of a system implementing a large number of safe threshold-detections on on-off type analog signals to be reduced.

Figure 4:
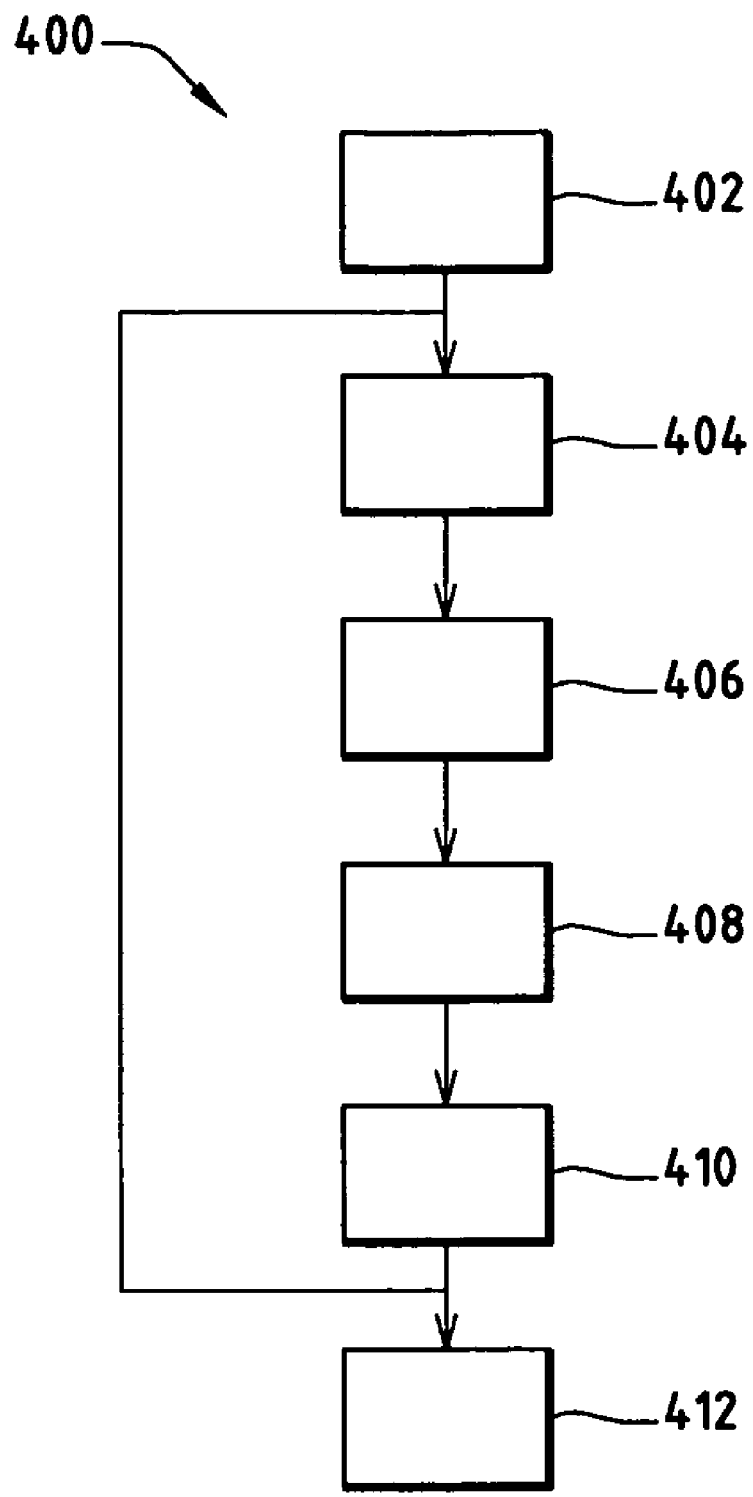
FIG. 4 is a flow chart illustrating the steps of the safe threshold-detection method implemented by the detection device, described in FIG. 3, according to the invention.

FIG. 4 shows a flow chart of a method 400 for the safe detection of state information from several analog input signals, in this case of the on-off type, implemented by an analog detection device of the type described in FIG. 3.

At a first initialization step 402, the state of operation of certain components is checked by injecting test signals into the inputs 344 and 352 of the device described in FIG. 3.

Next, at a step 404, on each of the acquisition diversity channels, each analog input signal is transformed into a safe adapted continuous signal and then sampled through an analog-to-digital conversion unit to form a digital output signal.

Then, at a step 406, for each analog input signal, a mutual comparison of the digital output signals associated with the same analog input signal is carried out in order to determine the consistency of the signals with each other in the form of a consistency result.

Next, at a step 408, for each analog input signal and for each acquisition channel, a comparison result associated with the channel and with the analog input signal is determined from a comparison between the digital output signal of the channel associated with the analog input signal and a reference signal.

Next, at a step 410, based on the consistency result determined at the step 406, a fault diagnostic on the device is carried out for detecting a fault on one or more of the acquisition channels, or even identifying the acquisition channel which is failing.

Also at the step 410, for each analog input signal a detected output state information item is determined as a function of the consistency result determined at the step 406 and of the comparison results of each channel determined at the step 408.

The steps are repeated according to a predetermined period which is a function of the sampling used for the analog-to-digital converters and the consistency check computation cycle times.

The step 412 is a step corresponding to the end of the running of the process for detecting safe state information items associated, respectively, with each analog input signal.

The method described is implemented advantageously by a corresponding device that is simple to develop and to validate, meeting the safety-related design requirements.

What is claimed:

1. A device for safe threshold-detection of state information from an analog signal, intended in particular for a railway type application, the device comprising:
    at least two acquisition diversity channels, each acquisition diversity channel including in series:
        a circuit for adapting the analog signal into a safe adapted continuous analog signal; and
        an unsafe channel threshold circuit able to supply channel state information comprising:
            a voltage source, the voltage source being temperature-stabilized over a predetermined temperature range and used as a voltage reference;
            an electronic analog-to-digital converter able to receive the safe adapted continuous analog signal as an input signal, and deliver a digital output signal sampling the input signal at a predetermined sampling frequency, and a comparison unit for comparing the digital output signal with a digital reference signal and able to supply channel output state information as a result of the comparison;

the device for safe threshold-detection of state information from an analog signal further comprising:

a fault detection circuit for detecting a fault, the fault detection circuit able to mutually compare the digital output signals of the analog-to-digital converters, and able to supply as a fault detection circuit output a consistency result, the consistency result being a function of the mutual comparison of the digital output signals; and a decision component able to determine safe detected state information at an output; the output of the decision component being a function of the consistency result supplied by the fault detection unit and of comparison results from the comparison units associated with the respective acquisition channels.

2. The device according to claim 1, wherein the input signal of each analog-to-digital converter is suitable for being sampled at a sufficient rate greater than twice the inverse of the duration of a transient corresponding to a change of state of the input signal.

3. The device according to claim 1, wherein the fault detection circuit comprises only one comparator able to mutually compare the digital output signals from sample by sample and able to declare a mutual consistency when the difference between two samples is within a predetermined width interval.

4. The device according to claim 1, wherein the fault detection circuit comprises at least two vector comparators able to mutually compare the digital output signals from the analog-to-digital converters based on a set of samples and able to declare a mutual consistency between two digital signals when a distance between two sets of samples is less than a predetermined value.

5. The device according to claim 1, wherein the temperature stability of the voltage source is adjusted so that the temperature sensitivity of each analog-to-digital converter is at least less than the temperature sensitivity of the detection threshold of a safe temperature-compensated semiconductor junction circuit, the temperature sensitivity being defined as a variation in one of the group of consisting of voltage and reference voltage, respectively, for the analog-to-digital converter and threshold voltage for the junction circuit, observed over a same predetermined temperature range.

6. The device according to claim 1, wherein the analog-to-digital converters are from different technological processes.

7. The device according to claim 1, wherein the adaptation circuit of one of the acquisition channels comprises a galvanic isolation transformer.

8. The device according to claim 7, wherein the adaptation circuit of one of the acquisition channels comprises a current rectifier circuit connected to the secondary of the transformer.

9. The device according to claim 1, wherein the device comprises only two acquisition channels, and in that when the mutual consistency result is negative, the fault detection circuit is able to deliver to the decision component an output signal at the restrictive state and able to additionally transmit a diagnostic signal regarding a failure of the device.

10. The device according to claim 1, wherein the device comprises at least three acquisition channels and in that when there is a majority of digital output signals that are substantially identical and when the channel states are identical, the decision component is able to deliver the state information of channels that are substantially identical as a safe output state of the device.

11. The device according to claim 10, wherein the fault detection circuit is able to transmit a diagnostic signal regarding the failure of the detection device when there are at least two distinctly different digital output signals.

12. The device according to claim 11, wherein the fault detection circuit is able to transmit a signal identifying the failing acquisition channel when two digital output signals are substantially identical and distinctly different from the remaining third, the acquisition channel identified as failing being said third channel.

13. The device according to claim 1, wherein each acquisition channel comprises a switching circuit with at least one input of a first type able to receive an adapted continuous signal, a second input of a second type able to receive a test signal and an output connected to the associated analogue-to-digital converter of the channel able to deliver an output signal forming a time multiplex of signals received at the inputs of the first and second types.

14. A method for safe threshold-detection of state information from safe analog signals, intended in particular for a railway type application, the method comprising the steps of:

sampling on at least two acquisition diversity channels adapted and isolated safe analog input signals, from the same analog input signal, to form digital output signals, using analog-to-digital converters, determining a mutual consistency of the digital output signals by comparison, and supplying a consistency result, on each digital output signal, making a comparison with a predetermined associated threshold and detecting a channel output state, determining safe detection output state information as a function of the consistency result and of the information of the output states of the acquisition diversity channels.

15. The method according to claim 14 further comprising:

checking the operating state of a plurality of components by injecting test signals into the inputs of the analog-to-digital converters.

16. A device for safe threshold-detection of state information in a railway operation comprising:

an analog signal;

at least two acquisition diversity channels receiving the analog signal, each channel including in series a circuit for adapting the analog signal into a safe adapted continuous analog signal and an analog-to-digital conversion circuit;

the analog to digital conversion circuit including:

an electronic analog-to-digital converter receiving the safe adapted continuous analog signal as an input signal and delivering a digital output signal sampling the input signal at a predetermined sampling frequency, a voltage source temperature-stabilized over a predetermined temperature range and used as a voltage reference; and a comparison unit for comparing the digital output signal with a digital reference signal and supplying channel output state information as a result of the comparison;

a fault detection circuit for detecting a fault, the fault detection circuit comparing the digital output signals of the analog-to-digital converters and supplying as a fault detection circuit output a consistency result, the consistency result being a function of the comparison of the digital output signals; and a decision component determining safe detected state information, an output of the decision component being a function of the consistency result supplied by the fault detection unit and of the channel output state information from the comparison units of the analog-to-digital conversion circuits associated with the respective acquisition channels.

17. The device as recited in claim 16 wherein the decision component receives three inputs, the first input being the consistency result, the second input being the channel output state information from the comparison unit of one of the at least two acquisition diversity channels and the third input being the channel output state information from the comparison unit of another of the at least two acquisition diversity channels.

* * * * *